United States Patent
Han

(10) Patent No.: US 11,347,070 B2
(45) Date of Patent: May 31, 2022

(54) OPTICAL ISOLATION DEVICE

(71) Applicant: LG CHEM, LTD., Seoul (KR)

(72) Inventor: Sang Choll Han, Seoul (KR)

(73) Assignee: LG CHEM, LTD., Seoul (KR)

( * ) Notice: Subject to any disclaimer, the term of this patent is extended or adjusted under 35 U.S.C. 154(b) by 279 days.

(21) Appl. No.: 16/333,152

(22) PCT Filed: Oct. 13, 2017

(86) PCT No.: PCT/KR2017/011310
§ 371 (c)(1),
(2) Date: Mar. 13, 2019

(87) PCT Pub. No.: WO2018/070826
PCT Pub. Date: Apr. 19, 2018

(65) Prior Publication Data
US 2019/0361254 A1 Nov. 28, 2019

(30) Foreign Application Priority Data
Oct. 13, 2016 (KR) .................. 10-2016-0132840

(51) Int. Cl.
*G02B 27/28* (2006.01)
*G02B 5/30* (2006.01)
*G02F 1/1335* (2006.01)

(52) U.S. Cl.
CPC ......... *G02B 27/283* (2013.01); *G02B 5/3016* (2013.01); *G02F 1/133536* (2013.01); *G02F 1/13355* (2021.01)

(58) Field of Classification Search
None
See application file for complete search history.

(56) References Cited

U.S. PATENT DOCUMENTS

| | | | |
|---|---|---|---|
| 4,913,529 A | 4/1990 | Goldenberg et al. | |
| 5,818,626 A | 10/1998 | Engstrom et al. | |
| 5,884,991 A | 3/1999 | Levis et al. | |
| 6,139,157 A | 10/2000 | Okuyuma | |
| 6,188,520 B1 * | 2/2001 | Huang | G02B 27/283 |
| | | | 359/629 |
| 7,905,602 B2 * | 3/2011 | Schuck | G03B 21/28 |
| | | | 353/20 |
| 8,757,806 B2 * | 6/2014 | Schuck | G02B 30/25 |
| | | | 353/7 |
| 9,967,037 B2 * | 5/2018 | Bitauld | H04L 9/0852 |
| 2011/0205495 A1 | 8/2011 | Coleman et al. | |

(Continued)

FOREIGN PATENT DOCUMENTS

| | | |
|---|---|---|
| JP | 2-189504 A | 7/1990 |
| JP | 04-267203 A | 9/1992 |
| JP | 4-310903 A | 11/1992 |

(Continued)

*Primary Examiner* — Derek S. Chapel
(74) *Attorney, Agent, or Firm* — Dentons US LLP

(57) ABSTRACT

The present application relates to an optical isolation device. The present application provides an optical isolation device having an excellent isolation ratio which can be formed simply and at low cost. Such an optical isolation device can be applied to various applications such as the field of optical communication or laser optics, the field of security or privacy protection, brightness enhancement of displays, or a use for hiding and covering.

14 Claims, 6 Drawing Sheets

(56) References Cited

U.S. PATENT DOCUMENTS

2013/0027656 A1 1/2013 Escuti et al.
2016/0119595 A1* 4/2016 Lyubarsky ........... G02B 27/145
353/20

FOREIGN PATENT DOCUMENTS

| | | |
|---|---|---|
| JP | 10-123321 A | 5/1998 |
| JP | 10-282337 A | 10/1998 |
| JP | 2001-166260 A | 6/2001 |
| JP | 2002-23107 A | 1/2002 |
| JP | 2003-167124 A | 6/2003 |
| JP | 2004-514174 A | 5/2004 |
| JP | 2005-134492 A | 5/2005 |
| JP | 2006-163343 A | 6/2006 |
| KR | 10-2000-0050976 A | 8/2000 |
| KR | 10-2015-0034631 A | 4/2015 |
| WO | 02/41627 A2 | 5/2002 |

* cited by examiner

[Figure 1]
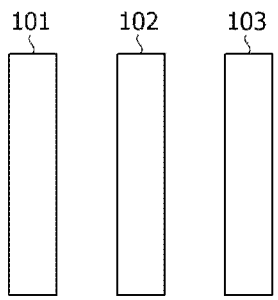
[Figure 2]
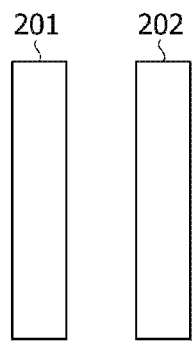
[Figure 3]
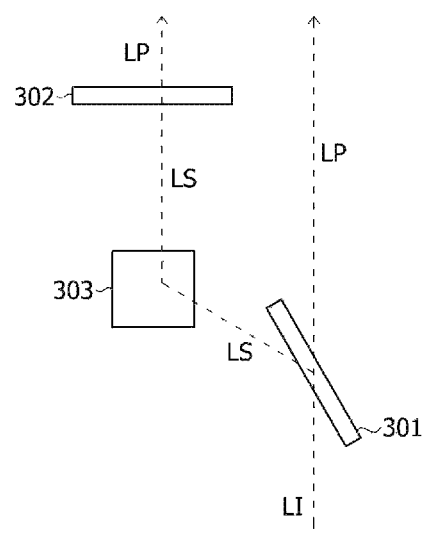

[Figure 4]
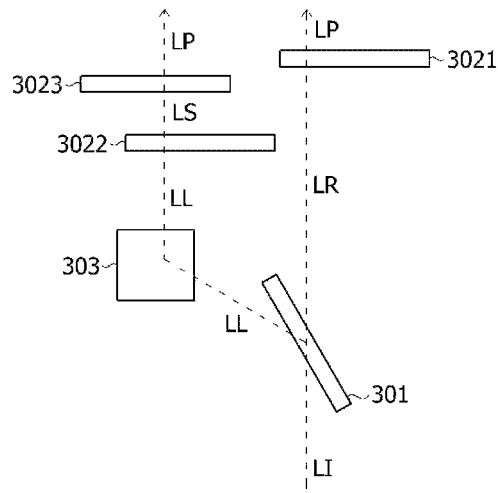
[Figure 5]
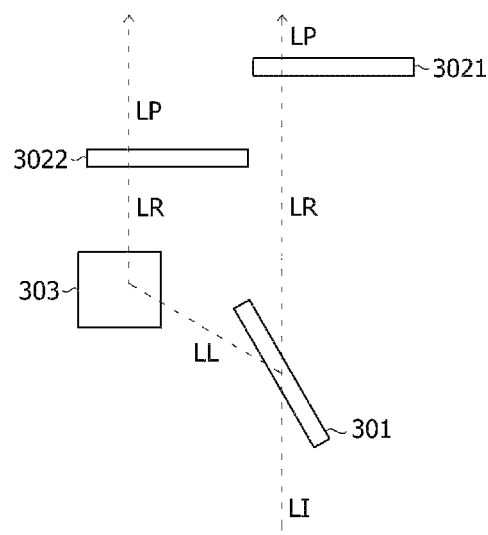
[Figure 6]
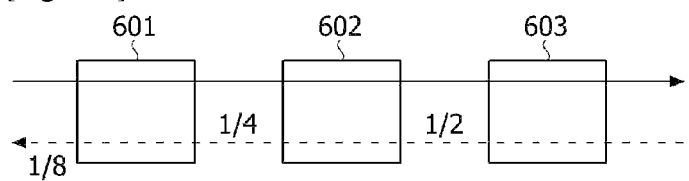

[Figure 7]
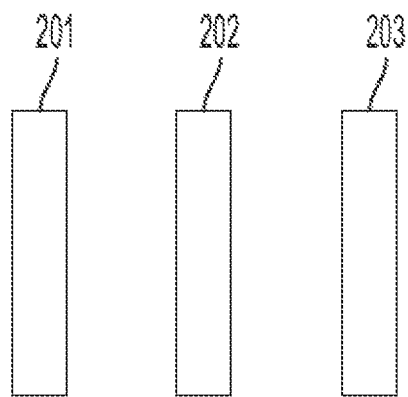
[Figure 8]
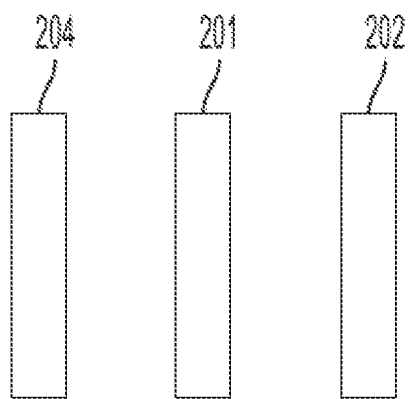

[FIGURE 9]
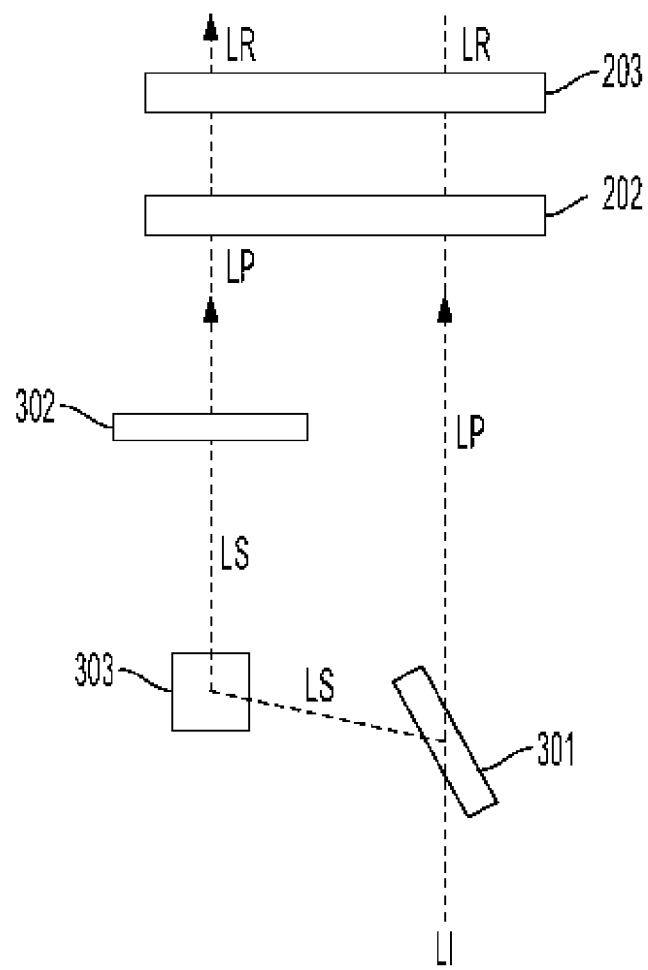

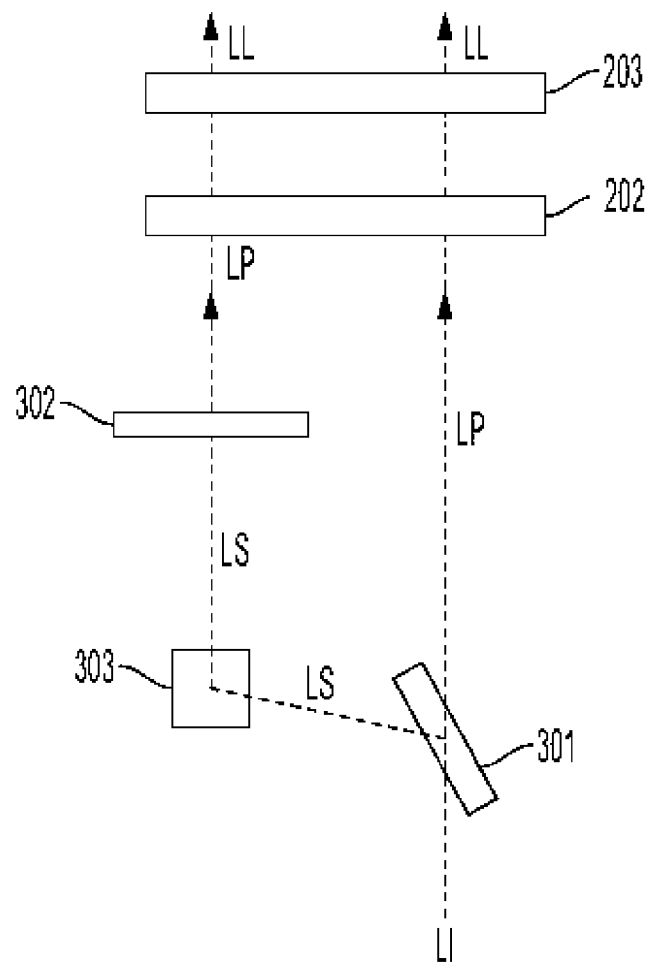
[FIGURE 10]

[FIGURE 11]
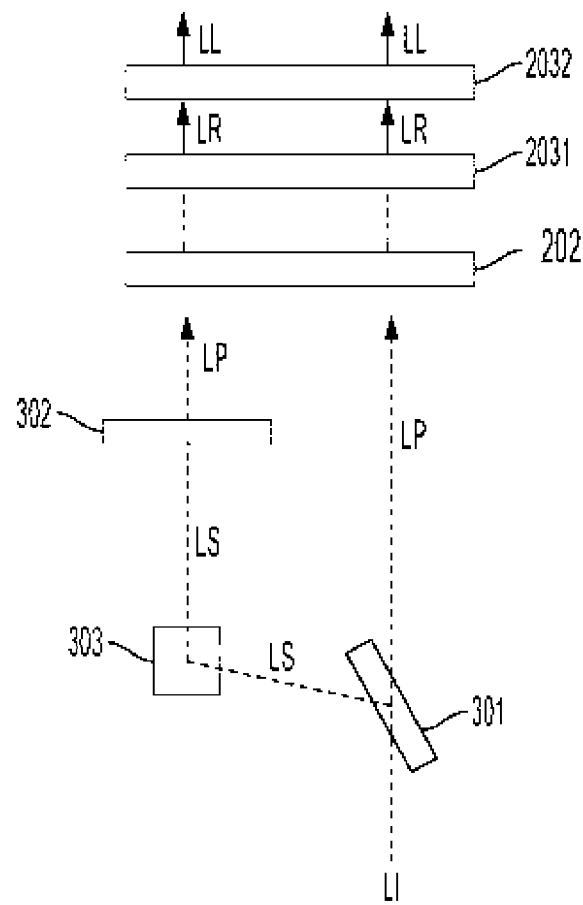
[FIGURE 12]
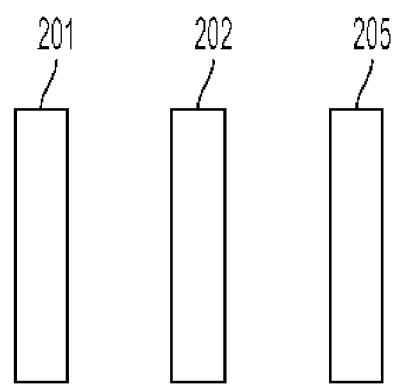

OPTICAL ISOLATION DEVICE

CROSS-REFERENCE TO RELATED APPLICATIONS

The present application is the U.S. national stage of International Application No. PCT/KR2017/011310 filed Oct. 13, 2017, which claims the benefit of priority based on Korean Patent Application No. 10-2016-0132840 filed on Oct. 13, 2016, the disclosure of which are incorporated herein by reference in their entirety.

TECHNICAL FIELD

The present application relates to an optical isolation device.

BACKGROUND ART

The optical isolation device is a device in which light transmittance in the forward direction is higher than light transmittance in the backward direction, which is also called an optical diode. The optical isolation device can be used to prevent unnecessary reflected light in the field of optical communication or laser optics, or it can also be applied to a building or automobile glass to be used for security or privacy protection, and the like. The optical isolation device can also be applied to applications such as brightness enhancement in various displays or military products for hiding and covering.

As the optical isolation device, there is a Faraday optical isolator using Faraday effect. The principle of the Faraday optical isolator is shown in FIG. 1. The Faraday optical isolator comprises a first polarizer (101), a Faraday rotator (102) and a second polarizer (103), where the absorption axes of the first and second polarizers (101, 103) are disposed to form 45 degrees with each other. The Faraday rotator rotates incident light linearly polarized by passing through the first polarizer by 45 degrees, whereby the incident light is transmitted through the second polarizer (forward direction). On the contrary, if the linearly polarized light transmitted through the second polarizer is equally rotated 45 degrees by the Faraday rotator, it becomes linearly polarized light parallel to the absorption axis of the first polarizer, so that it cannot be transmitted through the first polarizer (backward direction).

Since the Faraday optical isolator requires a very large external magnetic field for driving and an expensive material has to be applied thereto, it is difficult to make it large in size.

DISCLOSURE

Technical Problem

The present application relates to an optical isolation device.

Technical Solution

The term optical isolation device may mean a device configured such that the transmittance of light incident in either direction is relatively greater than the transmittance of light incident in the opposite direction. In the optical isolation device, the direction having a large forward transmittance of incident light can be referred to as a forward direction, and the opposite direction can be referred to as a backward direction. Here, the forward direction and the backward direction may form an angle of approximate 160 degrees to 200 degrees with each other, but is not limited thereto.

In this specification, the reference wavelength of optical properties such as the terms transmittance, retardation value, reflectance and refractive index can be determined according to light to be isolated by using the optical isolation device. For example, the reference wavelength may be the wavelength of the light to be isolated using the device. For example, when the optical isolation device is intended to isolate light in the visible light region, the reference wavelength of the transmittance or the like may be, for example, a value based on light having any wavelength within the range of 400 nm to 700 nm or about 550 nm; in the case of being intended to isolate light in the infrared region, the transmittance or the like may be determined based on light having a wavelength of 1,000 nm; and in the case of being intended to isolate light in the ultraviolet region, the transmittance or the like may be determined based on light having a wavelength of 250 nm.

In the optical isolation device, the ratio of the transmittance of the light incident in the forward direction and the transmittance of the light incident in the backward direction can be about 3 dB or more, by the isolation ratio (IR) depending on Equation 1 below. The upper limit of the isolation ratio is not particularly limited because it shows that the higher the numerical value is, the better the optical isolation effect. In one example, the isolation ratio may be about 10 dB or less, about 9.5 dB or less, about 9 dB or less, about 8.5 dB or less, about 8 dB or less, about 7.5 dB or less, about 7 dB or less, about 6.5 dB or less, about 6 dB or less, about 5.5 dB or less, about 5 dB or less, about 4.5 dB or less, or about 4 dB or less.

$$IR = 10 \times n \times \log(F/B) \qquad \text{[Equation 1]}$$

In Equation 1, IR is an isolation ratio, n is a number of optical isolation elements, which are described below, included in the optical isolation device, F (forward direction) is a transmittance of light incident on the optical isolation device in the forward direction, and B (backward direction) is a transmittance of light incident on the optical isolation device in the backward direction.

The transmittance of light incident in the forward direction of the optical isolation device may be about 50% or more, about 55% or more, about 60% or more, about 65% or more, about 70% or more, about 75% or more, about 80% or more, about 85% or more, about 90% or more, or about 95% or more. The upper limit of the forward transmittance may be about 100%. Also, the transmittance of light incident in the backward direction of the optical isolation device may be less than about 50%, about 45% or less, about 40% or less, about 35% or less, about 30% or less, about 25% or less, about 20% or less, about 15% or less, about 10% or less, or about 5% or less. The lower limit of the backward transmittance may be about 0%.

The optical isolation device may comprise at least one or more optical isolation elements. The term optical isolation element is a unit element forming an optical isolation device, which has an optical isolation function alone. Accordingly, the optical isolation element is also configured such that the transmittance of the light incident in the forward direction is relatively larger than the transmittance of the light incident in the backward direction, where the range of the isolation ratio, forward transmittance and backward transmittance can be applied equally by the contents mentioned in the optical isolation device.

The optical isolation element may comprise a polarization conversion element (PCS: polarization conversion system)

and a polarizer. As schematically shown in FIG. 2, the polarization conversion element (201) and the polarizer (202) may be located such that light incident on the side of the polarization conversion element (201) can be transmitted through the element (201) towards the polarizer (202). In this specification, the direction facing from the polarization conversion element (201) to the polarizer (202) may be referred to as the forward direction, and the direction facing from the polarizer (202) to the polarization conversion element (201) may be referred to as the backward direction. In an exemplary embodiment, an optional light-path controller (205) for controlling the traveling direction of light output from the polarizer along a forward direction may be arranged as illustrated in FIG. 12.

The polarization conversion element is configured such that it can convert unpolarized light incident in a first direction into linearly polarized light and output it to a second direction. Here, the linearly polarized light outputted to the second direction may be one linearly polarized light. That is, the linearly polarized light outputted to the second direction may not comprise two or more linearly polarized lights having different polarization directions from each other. The first and second directions may be directions approximately parallel to the forward direction. In the polarization conversion element, the transmittance of the light incident in the first direction to the second direction may be about 50% or more, about 55% or more, about 60% or more, about 65% or more, about 70% or more, about 75% or more, about 80% or more, about 85% or more, about 90% or more, or about 95% or more. The upper limit of the transmittance may be about 100%. That is, the polarization conversion element may be configured such that it can convert about 50% or more, about 55% or more, about 60% or more, about 65% or more, about 70% or more, about 75% or more, about 80% or more, about 85% or more, about 90% or more, or about 95% or more of the unpolarized light incident in the first direction into the linearly polarized light and output it to the second direction, and suitably, it can convert about 100% of the unpolarized incident light into linearly polarized light and output it to the second direction.

The configuration of the polarization conversion element capable of converting unpolarized light incident in the first direction into linearly polarized light and outputting it to the second direction is known. For example, such a polarization conversion element is known from U.S. Pat. Nos. 4,913,529, 5,884,991, 6,139,157 and US Patent Application Publication No. 2013-0027656, the disclosures of which are incorporated as part of this specification.

In one example, the polarization conversion element may comprise at least a polarization splitter and a retarder.

Here, the polarization splitter may be an element that splits the incident light into an orthogonal mode pair of polarized lights. Here, the orthogonal mode pair may comprise two linearly polarized lights whose polarization directions are perpendicular to each other or two circularly polarized lights whose rotation directions are opposite to each other. As used herein, the term vertical, horizontal, parallel or orthogonal may mean substantially vertical, horizontal, parallel or orthogonal, taking into account an error, where the error, for example, within ±10 degrees, within ±8 degrees, within ±6 degrees, within ±4 degrees, within ±2 degrees, within ±1 degree, or within ±0.5 degrees may exist. In addition, the term circularly polarized light herein is a concept including also so-called elliptically polarized light.

Polarization splitters capable of performing the above functions are variously known, the example of which can be exemplified by a so-called reflective polariscope. The reflective polariscope is a polarizer that any one polarized light among the orthogonal mode pair of polarized lights is transmitted and the other polarized light is reflected. Such a reflective polariscope includes a polarizing beam splitter, a wire grid polarizer (WGP) such as a metal wire grid polarizer, a dual brightness enhancement film (DBEF) or a cholesteric liquid crystal (CLC) film, which exhibits the above effects by applying a so-called anisotropic material polarization separator or a thin film coating type polarizer. For example, light having a desired wavelength range can be split to the orthogonal mode pair through control of the size or pitch of the grid in the metal wire grid polarizer, the laminated structure of the double brightness enhancement film, the pitch or the rotation direction of the liquid crystals in the cholesteric liquid crystal film, and the like. The type of the reflective polarizer applicable in the present application is not limited to the above, where all the reflective polarizers known to be capable of splitting the incident light into the orthogonal mode pair of polarized lights can be applied.

The polarization conversion element comprises a retarder. As the retarder, a λ/2 plate or a λ/4 plate may be applied. The term λ/2 plate is a retarder referred to as a so-called HWP (half wave plate), which is an element that when linearly polarized light is incident, the polarization direction of the linearly polarized light can be rotated by approximate 90 degrees, and the term λ/4 plate is a retarder referred to as a so-called QWP (quarter wave plate), which is an element capable of converting linearly polarized light and circularly polarized light to each other.

Retarders that can act as the λ/2 plate or λ/4 plate as above are variously known in this field. For example, the retarder may be a polymer stretched film or a liquid crystal polymer film. As the polymer stretched film, for example, an acrylic film, a polyolefin film such as a polyethylene film or a polypropylene film, a cycloolefin polymer (COP) film such as a polynorbornene film, a polyvinyl chloride film, a polyacrylonitrile film, a polysulfone film, a polyvinyl alcohol film or a cellulose ester polymer film such as a TAC (triacetyl cellulose) film, or a copolymer film of two or more monomers among monomers forming the polymer, and the like may be exemplified. The retarder may be formed by appropriately stretching such a film by a method known in this field. In addition, as the liquid crystal polymer film, a film obtained by orienting and polymerizing a known liquid crystal film such as a nematic liquid crystal or a discotic liquid crystal may be exemplified.

Retarders that can act as the λ/2 plate or λ/4 plate in this field are known and such films may be used without limitation in the present application.

Referring to drawings, a process of converting polarized light by the polarization splitter and the retarder will be described.

FIG. 3 is a diagram schematically showing a polarization conversion element when a splitter (301) for splitting the incident light into two linearly polarized lights having polarization directions perpendicular to each other, that is, P polarized light and S polarized light, for example, the polarizing beam splitter, metal wire grid polarizer or double brightness enhancement film as described above is used as a polarization splitter (301), where this polarization conversion element may comprise the polarization splitter (301) and the retarder (302). In this case, as the retarder (302), a λ/2 plate may be used.

As in FIG. 3, the incident light (LI) first enters the splitter (301) and is split into S polarized light (LS) and P polarized light (LP). When the above-described retarder (302) exists in a path where any one of the S and P polarized lights split as above passes and the direction of the optical axis of the retarder (302) is appropriately controlled, the polarized light passing through the retarder (302) can be converted into the same kind of polarized light as the polarized light not passing through the retarder (302). FIG. 3 shows a case where the S polarized light (LS) is converted into the P polarized light (LP) while passing through the retarder (302), without being limited thereto. As shown in FIG. 3, the polarization conversion element may comprise one or more light-path controllers (303) for controlling a path of light, where such a light-path controller (303) may be exemplified by a prism, a reflective plate, or the like.

Such a light-path controller can be used, for example, as a use for matching the traveling direction of polarized light passing through the retarder with that of the polarized light not passing through the retarder, as shown in FIG. 3.

FIG. 4 is a diagram schematically showing a polarization conversion element when a splitter (301) for splitting the incident light into two elliptically polarized lights whose rotation directions are opposite to each other, for example, the above-described cholesteric liquid crystal film is used as a polarization splitter (301). In this case, the polarization conversion element may comprise, as the retarders, a first retarder (3021), a second retarder (3022) and a third retarder (3023). In this case, as the first and second retarders (3021, 3022), the λ/4 plate may be used, and as the third retarder (3023), the λ/2 plate may be used.

As in FIG. 4, the incident light (LI) first enters the splitter (301) and is split into left-handed circularly polarized light (LL) and right-handed circularly polarized light (LR). Any one polarized light (LR) of the left-handed circularly polarized light and the right-handed circularly polarized light as split above can be converted into any one polarized light of S and P polarized lights, for example, S polarized light (LS) via the first retarder (3021). On the other hand, the other polarized light (LL) of the left- and right-handed circularly polarized lights can be controlled by the light-path controller (303) and then pass through the second retarder (3022), and the polarized light can be converted into a vertical mode pair of the polarized light passing through the first retarder (3021), for example, the P polarized light (LP), which subsequently, can pass through the third retarder (3023) and be converted into the same polarized light as the polarized light passing through the first retarder (3021).

FIG. 5 is another schematic diagram of the case where a splitter (301) for splitting the incident light into two elliptically polarized lights whose rotation directions are opposite to each other is used as a polarization splitter (301). In the case of FIG. 5, the light-path controller (303) can change the rotation direction while controlling the path of the circularly polarized light. For example, when the light-path controller is a reflective plate, the circularly polarized light may have the rotation direction changed to the opposite direction while being reflected by the reflective plate. In this case, even without the third retarder (3023), the polarization conversion element can generate the same linearly polarized light.

As described in FIGS. 3 to 5, the polarization conversion element comprises a polarization splitter and a retarder, wherein the polarization splitter and the retarder may be disposed such that any one polarized light of the vertical mode pair of polarized lights split by the polarization splitter is transmitted through the retarder, and the other polarized light is not transmitted the retarder. This case is suitable to the case where two linearly polarized lights having polarization directions perpendicular to each other that is, P polarized light and S polarized light, are generated by the polarization splitter, where a λ/2 plate can be used as the retarder.

In another example, the polarization conversion element comprises a polarization splitter and a retarder, wherein the polarization splitter and the retarder may be disposed such that all the vertical mode pair of polarized lights split by the polarization splitter can be transmitted through the retarder. In this case, an absolute value of a difference between a phase retardation value in the process in which any one polarized light of the vertical mode pair of polarized lights is transmitted through the retarder and a phase retardation value in the process in which the other polarized light is transmitted through the retarder may be λ/2. Here, λ may be a wavelength of the incident light. This is suitable to the case where two circularly polarized lights whose rotation directions are opposite to each other are generated by the polarization splitter as in the case of FIG. 4, where the retarder may comprise at least one λ/2 plate and at least one λ/4 plate. FIG. 4 shows a case to have two λ/4 plates, but by controlling the light path appropriately, it is possible to secure the same effect as in FIG. 4 by one λ/4 plate as well.

In another example, the polarization conversion element comprises a polarization splitter and a retarder, wherein the polarization splitter and the retarder may be disposed such that all the vertical mode pair of polarized lights split by the polarization splitter can be transmitted through the retarder. In this case, a phase retardation value in the process in which any one polarized light of the vertical mode pair of polarized lights is transmitted through the retarder and a phase retardation value in the process in which the other polarized light is transmitted through the retarder may be substantially equal to each other. This case is suitable to the case where two circularly polarized lights whose rotation directions are opposite to each other are generated by the polarization splitter as in the case of FIG. 5, where the retarder may be a λ/4 plate.

As confirmed in FIGS. 3 to 5, the polarization conversion element may further comprise a light-path controller, such as a prism or a reflective plate, if necessary.

The optical isolation element comprises a polarizer together with the above-described polarization conversion element, where the polarizer is disposed at a position where the linearly polarized light traveling in a forward direction and transmitted through the optical isolation element can enter. As the polarizer, for example, an absorbing linear polarizer can be used. The absorbing linear polarizers are variously known in the art and, for example, so-called PVA (polyvinyl alcohol) polarizers can be used. This absorbing polarizer has a transmission axis formed in one direction and an absorption axis formed in a direction perpendicular to the transmission axis, where the polarizer may be disposed such that the transmission axis is parallel to the polarization direction of the linearly polarized light generated by being transmitted through the polarization conversion element. In such a case, the light that is incident in the forward direction and is transmitted through the polarization conversion element can theoretically be transmitted 100%, and at least 50% of the light transmitted in the backward direction is absorbed and blocked by the absorbing linear polarizer.

The optical isolation element may further comprise a phase retardation plate (203). Here, the phase retardation plate (203) is an optical element having the same concept as the above-described retarder, but in the present application, it is referred to as a phase retardation plate (203) in order to distinguish it from the retarder included in the polarization conversion element. The phase retardation plate (203) may be located at a position where light traveling in a forward direction enters after being transmitted through the polarizer, as illustrated in FIG. 7. Such a phase retardation plate (203) can solve a problem that may occur as the light once transmitted through the optical isolation element in the forward direction travels toward the optical isolation element again by reflection or the like. That is, the light reflected due to the presence of the phase retardation plate (203) will be converted into linearly polarized light parallel to the absorption axis of the absorbing polarizer, thereby being absorbed back to the polarizer.

In this case, the above-described $\lambda/4$ plate may be used as the phase retardation plate. The specific types of the $\lambda/4$ plate are as described above.

In this case, the phase retardation plate (203) may be disposed such that its optical axis (e.g., slow axis) forms an angle in a range of about 40 degrees to 50 degrees, for example, about 45 degrees, or in a range of 130 degrees to 140 degrees, for example, about 135 degrees, with the transmission axis of the absorbing polarizer. FIGS. 9 and 10 illustrate exemplary embodiments where the incident light (LI) first enters the splitter (301) and is split into S polarized light (LS) and P polarized light (LP). When the retarder (302) exists in a path where any one of the S and P polarized lights split as above passes and the direction of the optical axis of the retarder (302) is appropriately controlled, the polarized light passing through the retarder (302) can be converted into the same kind of polarized light as the polarized light not passing through the retarder (302). In an exemplary embodiment, the optical isolation element may comprise a phase retardation plate (203) such that both the S polarized light (LS) and the P polarized light (LP) may be converted to right-hand circularly polarized light (LR), as illustrated in FIG. 9, and in another exemplary embodiment, both the S polarized light (LS) and the P polarized light (LP) may be converted to left-handed circularly polarized light (LL), as illustrated in FIG. 10.

A $\lambda/2$ plate or a $\lambda/4$ plate may be used as the phase retardation plate (203). As illustrated in FIG. 11, the incident light (LI) first enters the splitter (301) and is split into S polarized light (LS) and P polarized light (LP). When the above-described retarder (302) exists in a path where any one of the S and P polarized lights split as above passes and the direction of the optical axis of the retarder (302) is appropriately controlled, the polarized light passing through the retarder (302) can be converted into the same kind of polarized light as the polarized light not passing through the retarder (302). FIG. 11 shows a case where the S polarized light (LS) is converted into the P polarized light (LP) while passing through the retarder (302), without being limited thereto. As shown in FIG. 11, the optical isolation element may comprise one or more phase retardation plates (2031, 2032). In exemplary embodiments, the phase retardation plate (2031) may be a $\lambda/4$ plate and the phase retardation plate (2032) may be a $\lambda/2$ plate, as illustrated in FIG. 11.

The optical isolation element may further comprise, if necessary, a light-path controller, such as a prism or a reflective plate, which can additionally control the light path, in addition to those included in the above-described polarization conversion element.

In addition, the optical isolation element may comprise, if necessary, additional optical components other than the above. For example, the optical isolation element may comprise an optical component, such as a telescope.

In this case, the telescope (204) may exist at the incident side of the forward traveling path of light, for example, at a position through which light before entering the polarization conversion element can pass, as illustrated in FIG. 8. Such a telescope can serve to transmit light to the polarization conversion element by controlling an incident area of light. For example, the telescope can serve to transmit light to the polarization conversion element by reducing the incident area of light to approximately ½ times. Such an optical component may be required to equalize the forward and backward incident areas of light in the optical isolation device.

The optical isolation device may comprise one or two or more optical isolation elements as above. When two or more optical isolation elements (601, 602, 602) are included, each of the optical isolation elements may be disposed so that the light transmitted through any one optical isolation element along the forward direction (from 601 to 602, and/or from 602 to 603) may enter the side of the polarization conversion element of the other optical isolation element. By applying a plurality of optical isolation elements as above, the optical isolation ratio can be more improved. For example, referring to FIG. 6, theoretically, light transmitted through a number of optical isolation elements in the forward direction (From 601 to 602, and/or from 602 to 603) continues to be transmitted without loss, but in the case of light transmitted in the backward direction, it continues to be reduced by an exponent of ½. Therefore, by controlling the number of the optical isolation elements, it is possible to maximize the optical isolation ratio.

Advantageous Effects

The present application provides an optical isolation device having an excellent optical isolation ratio which can be formed simply and at low cost. Such an optical isolation device can be applied to various applications such as the field of optical communication or laser optics, the field of security or privacy protection, brightness enhancement of displays, or a use for hiding and covering.

BRIEF DESCRIPTION OF DRAWINGS

FIG. 1 is a diagram schematically showing a Faraday optical isolator.

FIGS. 2, 7, 8 and 12 are diagrams showing a basic configuration of an optical isolation element of the present application.

FIGS. 3 to 5 and 9-11 are diagrams for explaining principles of a polarization conversion element.

FIG. 6 is a diagram schematically showing a case where a number of optical isolation elements are included.

MODE FOR INVENTION

Hereinafter, the present application will be described in detail with reference to the following examples and comparative examples, but the scope of the present application is not limited to the following examples.

Example 1

An element of the type as in FIG. 5 was manufactured and its performance was tested. In this process, a reflective plate (mirror) was used as the light-path controller, products (WPQ05M-532) from Thorlabs were used as the retarders (3021, 3022) and a PBS (polarizing beam splitter) product (PBS251) from Thorlabs was also applied as the polarization splitter. A Genesis MX SLM laser from Coherent Inc. was incident on the element as above (power 10 mW) to test the element. The forward transmittance obtained in this manner was about 76%, the backward transmittance was about 36%, and the isolation ratio (IR) was about 3.2 dB.

The invention claimed is:

1. An optical isolation device comprising at least one optical isolation element,
   wherein the optical isolation element comprises a polarization conversion element and a polarizer,
   wherein the polarization conversion element and the polarizer are located such that light incident on a side of the polarization conversion element is transmitted through the polarization conversion element and is then incident on the polarizer,
   wherein a direction from the polarization conversion element to the polarizer is a forward direction,
   wherein the optical isolation element further comprises a phase retardation plate at a position where light transmitted through the polarizer in a forward direction is incident on the phase retardation plate,
   wherein the polarization conversion element comprises a polarization splitter and a retarder, the polarization splitter being configured to split the incident light into a pair of vertically polarized light waves,
   wherein the polarization conversion element is configured to convert the unpolarized incident light incident along the forward direction on the polarization conversion element into linearly polarized light and outputs the linearly polarized light from the polarization conversion element along the forward direction,
   wherein the polarizer is an absorbing linear polarizer having a transmission axis in one direction and an absorption axis in a direction perpendicular to the transmission axis, and
   wherein the polarizer is disposed such that its transmission axis is parallel to a polarization direction of the linearly polarized light from the polarization conversion element, and
   wherein the phase retardation plate comprises a $\lambda/4$ plate.

2. The optical isolation device according to claim 1, wherein a transmittance of light along the forward direction is more than 50% and an isolation ratio (IR) defined by Equation 1 below is 3 dB or more:

$$IR = 10 \times n \times \log(F/B) \quad \text{[Equation 1]}$$

wherein, IR is the isolation ratio, n is a number of optical isolation elements included in the optical isolation device, F is a transmittance of light incident on the optical isolation device along the forward direction, and B is a transmittance of light incident on the optical isolation device along a backward direction.

3. The optical isolation device according to claim 1, wherein the polarization splitter is a polarizing beam splitter, a wire grid polarizer, a dual brightness enhancement film or a cholesteric liquid crystal film.

4. The optical isolation device according to claim 1, wherein the retarder is disposed at a position where any one of the pair of vertically polarized light waves passes through the retarder and the other one of the pair of vertically polarized light waves does not pass through the retarder.

5. The optical isolation device according to claim 4, wherein the retarder is a $\lambda/2$ plate.

6. The optical isolation device according to claim 1, wherein the retarder comprises at least a first retarder and a second retarder,
   wherein the first retarder and the second retarder are disposed at a position where one of the pair of vertically polarized light waves passes through the first retarder and the other of the pair of vertically polarized light waves passes through the second retarder, and
   wherein an absolute value of a difference between a first phase retardation value when the one of the pair of vertically polarized light waves passes through the first retarder and a second phase retardation value when the other of the pair of vertically polarized light waves passes through the second retarder is $\lambda/2$.

7. The optical isolation device according to claim 6, wherein each of the first and second retarders is individually selected from a $\lambda/2$ plate and a $\lambda/4$ plate.

8. The optical isolation device according to claim 1, wherein the retarder comprises at least a first retarder and a second retarder,
   wherein the first retarder and the second retarder are disposed at a position where one of the pair of vertically polarized light waves passes through the first retarder and the other of the pair of vertically polarized light waves passes through the second retarder, and
   wherein a first phase retardation value when the one of the pair of vertically polarized light waves passes through the first retarder and a second phase retardation value when the other of the pair of the vertically polarized light waves passes through the second retarder are equal.

9. The optical isolation device according to claim 8, wherein each of the first and second retarders comprises a $\lambda/4$ plate.

10. The optical isolation device according to claim 1, wherein the polarization conversion element further comprises a prism or a reflective plate for controlling a path of light.

11. The optical isolation device according to claim 1, wherein the phase retardation plate is disposed such that its slow axis forms an angle in a range of 40 degrees to 50 degrees with the transmission axis of the polarizer.

12. The optical isolation device according to claim 1, further comprising a telescope present at a position where light traveling in the forward direction is incident on the telescope before being incident on the polarization conversion element.

13. The optical isolation device according to claim 1, further comprising a light-path control element for controlling the traveling direction of light outputting the polarizer along the forward direction.

14. The optical isolation device according to claim 1, wherein the phase retardation plate is disposed such that its slow axis forms an angle in a range of 130 degrees to 140 degrees with the transmission axis of the polarizer.

* * * * *